(12) United States Patent
Bertolotti

(10) Patent No.: US 9,255,568 B2
(45) Date of Patent: Feb. 9, 2016

(54) ROTOR FOR A WIND TURBINE

(75) Inventor: Fabio Bertolotti, Bad Bentheim (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 882 days.

(21) Appl. No.: 13/511,870

(22) PCT Filed: Nov. 1, 2010

(86) PCT No.: PCT/EP2010/066556
§ 371 (c)(1),
(2), (4) Date: May 24, 2012

(87) PCT Pub. No.: WO2011/064070
PCT Pub. Date: Jun. 3, 2011

(65) Prior Publication Data
US 2012/0294738 A1    Nov. 22, 2012

(30) Foreign Application Priority Data
Nov. 26, 2009  (DE) .......................... 10 2009 044 667

(51) Int. Cl.
*F03D 7/02*  (2006.01)
(52) U.S. Cl.
CPC ........... *F03D 7/0224* (2013.01); *F05B 2260/79* (2013.01); *Y02E 10/721* (2013.01); *Y02E 10/723* (2013.01)
(58) Field of Classification Search
CPC ......... F03D 7/0224; F03D 7/024; F03D 7/00; F03D 11/0075; F03D 11/005; Y02E 10/722; Y02E 10/721; Y02E 10/723
See application file for complete search history.

(56) References Cited

U.S. PATENT DOCUMENTS

2006/0099075 A1*  5/2006  Von Mutius .................. 416/131
2011/0142617 A1*  6/2011  Mashue et al. ................ 415/229

FOREIGN PATENT DOCUMENTS

| DE | 196 34 059 C1 | 10/1997 |
| DE | 199 48 997 A1 | 4/2001 |
| DE | 20 2004 009 839 U1 | 11/2005 |
| DE | 10 2008 055 473 A1 | 6/2010 |
| DE | 10 2009 045 467 A1 | 4/2011 |
| EP | 1 995 453 A1 | 11/2008 |
| GB | 2159584 A * | 12/1985 |
| WO | WO 2010063562 A2 * | 6/2010 |

OTHER PUBLICATIONS

International Search Report (in German with English translation) and Written Opinion (in German) for PCT/EP2010/066556, mailed Sep. 29, 2011; ISA/EP.
International Preliminary Report on Patentability (Chapter I of the Patent Cooperation Treaty) for PCT/EP2010/066556, issued Jun. 5, 2012.

* cited by examiner

*Primary Examiner* — Edward Look
*Assistant Examiner* — Danielle M Christensen
(74) *Attorney, Agent, or Firm* — Harness, Dickey & Pierce, P.L.C.

(57) ABSTRACT

The invention relates to a rotor for a wind turbine of the type having a rotor hub (8) and a set of rotor blades (9). Each rotor blade (9) is rotatably mounted on the rotor hub (8) for rotation about a blade axis (11). A threaded spindle mechanism (13) interconnects the rotor blade (9) and the rotor hub (8). The threaded spindle mechanism (13) includes a spindle nut (32), a threaded spindle (31) and a drive (21) mounted on the rotor blade (9) adjacent a transition between the rotor hub (8) and the rotor blade (9). The drive (21) is rotatable together with the rotor blade (9) about the blade axis (11) relative to the rotor hub (8) by actuation of the threaded spindle mechanism (13).

15 Claims, 5 Drawing Sheets

ROTOR FOR A WIND TURBINE

CROSS-REFERENCE TO RELATED APPLICATIONS

This application is a 371 U.S. National Stage of International Application No. PCT/EP2010/066556, filed Nov. 1, 2010, and claims priority to German Patent Application No. 10 2009 044 667.2 filed Nov. 26, 2009, the disclosures of which are herein incorporated by reference in their entirety.

FIELD

The invention relates to wind turbines, and more particularly to a rotor for a wind turbine, with a rotor hub, at least one rotor blade rotatably mounted about a blade axis on the rotor hub, and at least one threaded spindle mechanism which is installed between the rotor hub and the rotor blade and is connected to both the rotor hub and the rotor blade, and is rotatable about the blade axis relative to the rotor hub by actuation of the threaded spindle mechanism, which comprises a spindle nut, a threaded spindle and a drive.

BACKGROUND

Such a rotor is described in German Patent Applications 10 2008 055 473.1 and 10 2009 045 467.5. In previous constructions the drive of the threaded spindle mechanism mounted on the rotor hub is located at a relatively large distance from the rotor blade, so that access to the drive is difficult for service staff. In some cases the drive is even arranged outside the interior of the rotor hub, so that apart from a further complication as regards accessibility, measures also have to be taken against lightning strikes and other meteorological influences.

SUMMARY

Against this background the object of the invention is to improve the accessibility of the drive of the threaded spindle mechanism in a rotor of the type mentioned in the introduction.

This object is achieved according to the invention with a rotor according to the present disclosure.

The rotor according to the invention for a wind turbine comprises a rotor hub, at least one rotor blade rotatably mounted about a blade axis on the rotor hub, and at least one threaded spindle mechanism which is installed between the rotor hub and the rotor blade and is connected to both the rotor hub and the rotor blade, and is rotatable about the blade axis relative to the rotor hub by actuation of the threaded spindle mechanism, which comprises a spindle nut, a threaded spindle and a drive, which is mounted on the rotor blade in the region of the transition between the rotor hub and the rotor blade, and can rotate together with this about the blade axis.

Due to the arrangement of the drive, the latter is readily accessible to service staff and is simple to maintain. In particular, the drive is arranged in the handling area of the rotor hub so that it is easily within arm's reach of a service person working in the rotor hub.

The spindle nut is connected in particular via a screw connection to the threaded spindles. Preferably the spindle nut is screwed onto the threaded spindle. The rotor hub includes in particular an inner chamber. In addition the rotor blade includes in particular an inner chamber, which is preferably adjacent to the inner chamber of the rotor hub. In particular the inner chamber of the rotor blade is joined to the inner chamber of the rotor hub. Preferably the inner chamber of the rotor blade transforms into the inner chamber of the rotor hub.

According to a first variant of the invention the drive projects into the inner chamber of the rotor hub and/or the drive is arranged in the inner chamber of the rotor hub. The drive is in this case particularly easily accessible, but also takes up installation space in the interior of the rotor hub. According to a second variant of the invention the drive projects into the inner chamber of the rotor blade and/or the drive is arranged in the inner chamber of the rotor blade. In this way the installation space taken up by the threaded spindle mechanism in the inner chamber of the rotor blade can be reduced. Furthermore access to the drive is only slightly more difficult compared to the first variant, and its accessibility is still acceptable.

A wall element is preferably secured to the end of the rotor blade facing towards the rotor hub, and serves in particular to stabilise the rotor blade. The wall element is preferably arranged on the front face of the rotor blade and separates in particular the inner chamber of the rotor blade from the inner chamber of the rotor hub. Preferably the wall element extends transverse to the blade axis. Preferably the wall element traverses or spans, in particular completely or at least partly, the inner chamber of the rotor blade or the opening of the rotor blade facing towards the rotor hub transverse to the blade axis. Furthermore the wall element can be installed in the inner chamber of the rotor blade. Preferably the wall element covers, in particular completely or partly, the inner chamber of the rotor blade. The wall element is preferably rigidly connected to the rotor blade and/or is connected in a torque-resistant manner with respect to a rotation about the rotor blade, so that it can rotate together with the rotor blade about the blade axis. Preferably a window-like opening is provided in the wall element, through which access to the inner chamber of the rotor blade can be gained from the inner chamber of the rotor hub. According to a modification of the invention the drive is mounted on the wall element.

The drive can be rigidly secured to the rotor blade and/or to the wall element. Preferably however the drive is rotatably mounted on the rotor blade and/or the wall element about a blade-side swivel axis, which runs in particular in the direction of the blade axis and is preferably spaced from the latter. Accordingly, the threaded spindle mechanism can, for example, be prefabricated as a module and can preferably be mounted as a whole unit.

The threaded spindle together with the spindle nut preferably forms a sub-assembly. According to a modification of the invention the sub-assembly formed from the threaded spindle and the spindle nut is rotatably mounted on the rotor hub about a hub-side swivel axis, which runs in particular in the direction of the blade axis and is preferably spaced therefrom. The threaded spindle is preferably coupled to the drive and can be rotated by this about its longitudinal axis, the spindle nut being mounted on the rotor hub. In particular the spindle nut is mounted on the rotor hub so as to be able to swivel about the hub-side swivel axis.

According to a development of the invention the threaded spindle mechanism comprises an actuating member coupled to the spindle nut, by means of which the spindle nut is mounted on the rotor hub. In particular the actuating member is mounted on the rotor hub so as to be able to swivel about the hub-side swivel axis.

According to a modification of the invention the threaded spindle is detachably coupled to the drive. Preferably the actuating member is also detachably coupled to the spindle nut. Thus, the sub-assembly formed from the threaded spindle and spindle nut can be separated from the threaded spindle mechanism. Since this sub-assembly is subject to a relatively high level of wear, the fact that it can be detached facilitates the maintenance of the threaded spindle mechanism. In particular the sub-assembly can be replaced without having to dismantle the whole threaded spindle mechanism. The threaded spindle is preferably coupled to the drive via the interconnection of a coupling shaft, to which the threaded spindle is detachably secured by at least one securement means. The coupling shaft is coupled to the drive and can be rotated by the latter. The sub-assembly is preferably connected between the coupling shaft and the actuating member.

According to a development of the invention the threaded spindle mechanism comprises a transmission, the threaded spindle being coupled to the drive via the interconnection of the transmission. The threaded spindle is arranged in particular outside the drive. The transmission is formed for example as a gear mechanism, as a belt drive or as a planetary gear mechanism. Accordingly, conventional drives can be used so that cost savings can be made. According to a modification of the invention the transmission is connected between the drive and the coupling shaft. Furthermore, the coupling shaft can form an output or take-off shaft of the transmission. Preferably the drive is mounted via the transmission and/or its transmission housing on the rotor blade and/or on the wall element.

The drive comprises in particular a drive shaft, which is coupled preferably directly or indirectly, for example via the transmission, to the threaded spindle. A rotation of the threaded spindle about its longitudinal axis can thus be produced by a rotation of the drive shaft about its longitudinal axis. The coupling shaft can be formed for example by the drive shaft, by the output shaft of the transmission, or by another shaft that is connected between the threaded spindle and the drive and/or the transmission. Preferably the drive comprises at least one motor with a motor shaft, so that the drive shaft is formed in particular by the motor shaft or is coupled thereto. The drive is in particular an electric drive. The motor is preferably an electric motor.

The drive together with the rotor blade can rotate about the blade axis relative to the rotor hub. This rotatability has to be taken into account when installing connecting lines, via which the drive is supplied. This additional effort and expenditure is however more than compensated by the easier accessibility of the drive and the lower maintenance costs associated therewith. In the case of an electric drive the connecting lines are electrical connecting lines, via which the drive is supplied with electric current.

According to a first alternative of the invention the drive shaft of the drive coupled to the threaded spindle runs transverse to the longitudinal axis of the threaded spindle. With this arrangement the drive can in some cases be subjected to relatively high gyroscopic loads. According to a second alternative of the invention the drive shaft of the drive coupled to the threaded spindle therefore runs parallel to the longitudinal axis of the threaded spindle. The threaded spindle mechanism can thus be designed more compactly as regards the drive, so that gyroscopic loads of the drive can be reduced.

The invention furthermore relates to a wind turbine with a nacelle, a rotor rotatably mounted about a rotor axis on the nacelle and which can be rotated about the rotor axis by the wind, and a generator mechanically coupled to the rotor. The generator can be electrically driven by the rotor, wherein the rotor is a rotor according to the invention and can be developed in accordance with all modifications described in this connection. In particular the blade axis runs transverse or substantially transverse to the rotor axis. By means of the threaded spindle mechanism the rotor blade can rotate about its blade axis relative to the rotor hub, whereby preferably the rotational speed of the rotor and thus also the rotational speed of the generator can be varied.

BRIEF DESCRIPTION OF DRAWINGS

The invention is described hereinafter with the aid of preferred exemplary embodiments and with reference to the drawings, in which.

DETAILED DESCRIPTION

Figure 1:
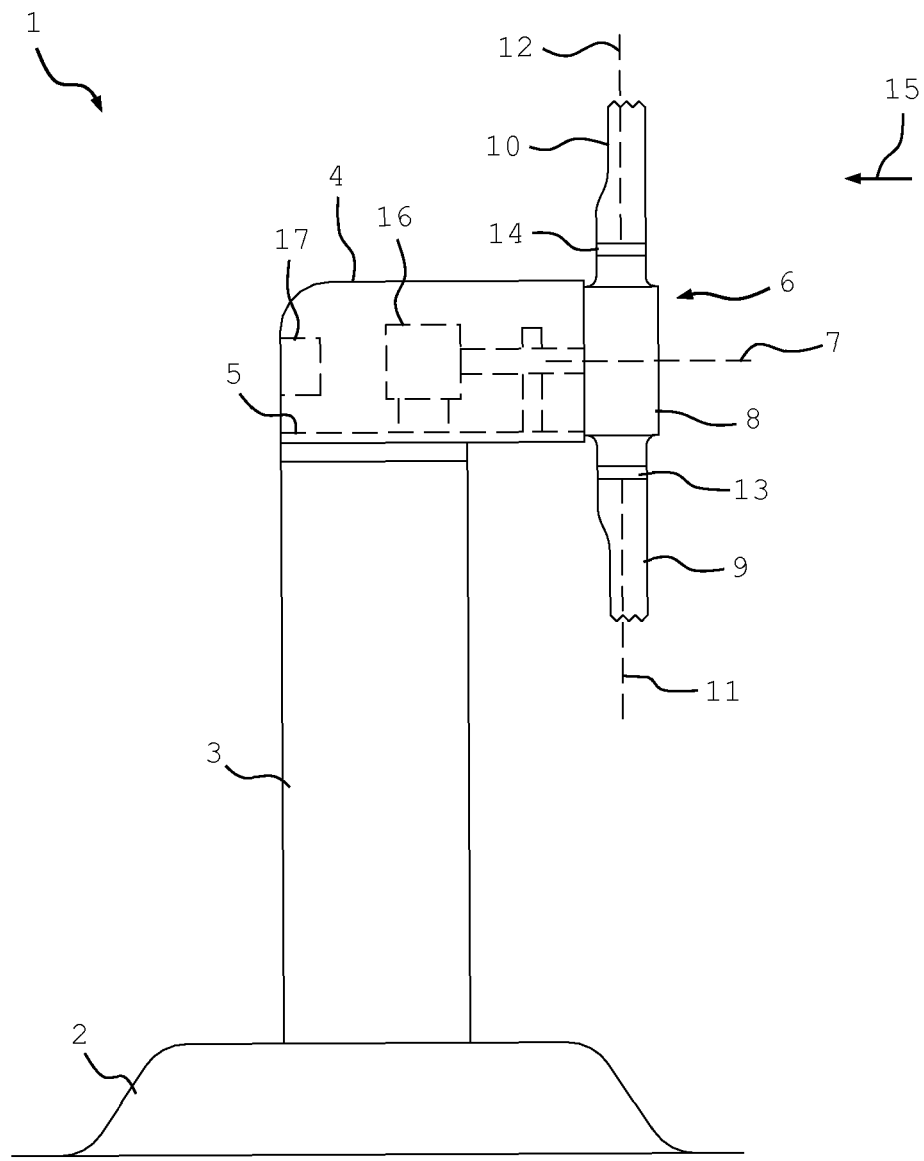
FIG. 1 is a schematic representation of a wind turbine with a rotor according to a first embodiment of the invention.

A wind turbine 1 is shown in FIG. 1, in which a tower 3 standing on a foundation 2 is connected at its end remote from the foundation 2 to a machine house 4. The machine house 4 comprises a nacelle 5, on which a rotor 6 is rotatably mounted about a rotor axis 7, said rotor comprising a rotor hub 8 and rotor blades 9 and 10 connected thereto, which are respectively rotatable about their blade axis 11 and 12 relative to the rotor hub 8. The rotor blades 9 and 10 are respectively mechanically coupled to a blade angle adjustment drive 13 and 14, by means of which the respective rotor blade can be rotated about the associated blade axis. The rotor 6 can be rotated about the rotor axis 7 by the wind 15 and is mechanically coupled to an electric generator 16, which is secured to the nacelle 5 and in particular is arranged in the machine house 4. A wind turbine control unit 17 is provided for the controlled operation of the wind turbine 1, by means of which inter alia the blade angle adjustment drives 13 and can be controlled. Although only two rotor blades are shown, the rotor can also comprise three or more rotor blades.

Figure 2:
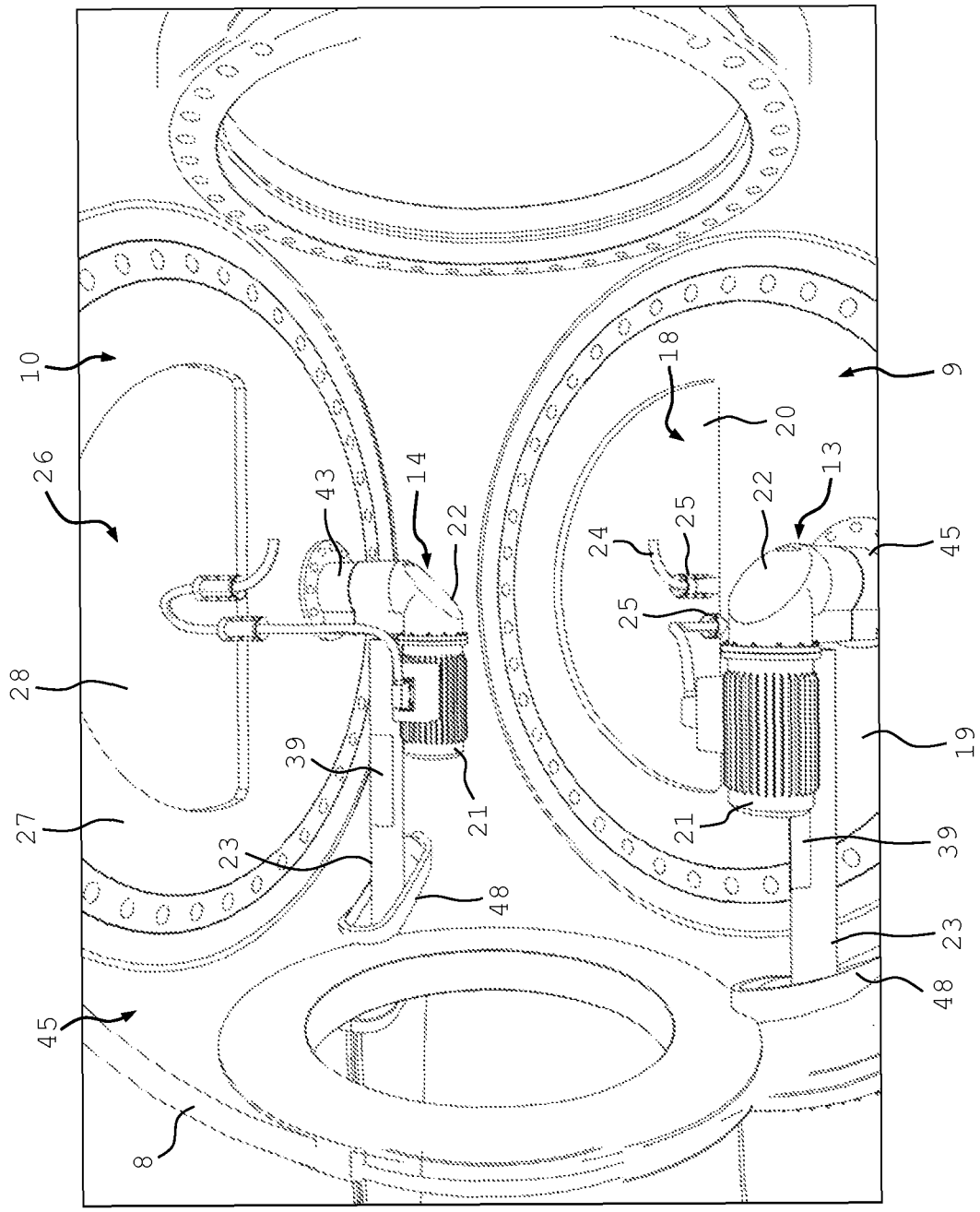
FIG. 2 is an internal view of the rotor hub visible in FIG. 1.

An inner view of the rotor hub 8 is shown in FIG. 2, in which the rotor blade 9 has an inner chamber 18 and is closed on the front by a wall element 19 at its end facing towards the rotor hub 8. The wall element 19 serves to stabilise the rotor blade 9 and separates the inner chamber 18 of the rotor blade 9 from the inner chamber 45 of the rotor hub 8. The wall element 19 is provided with a window-like opening 20, through which access to the inner chamber 18 can be gained. The blade angle adjustment drive 13 engages with the wall element 19 and has a drive 21 formed by an electric motor, a transmission 22 and a linear adjustment member 23, which is mounted on the rotor hub 8 on its side facing away from the rotor blade 9. The drive 21 is connected to electrical connecting lines 24 and can be supplied by the latter with electric current. The connecting lines 24 are routed by means of cable holders 25 in the rotor hub 8 in such a way that they can follow a movement of the drive 21 relative to the rotor hub 8.

The rotor blade 10 comprises an inner chamber 26 and is closed at the front by a wall element 27 at its end facing towards the rotor hub 8. The wall element 27 serves to stabilise the rotor blade 10 and separates the inner chamber 26 of the rotor blade 10 from the inner chamber 45 of the rotor hub 8. Furthermore the wall element 27 comprises a window-like opening 28, through which the inner chamber 26 of the rotor blade 10 can be accessed from the rotor hub 8. The blade angle adjustment drive 14 engages on the wall element 27, and is of identical construction to the blade angle adjustment drive 13, so that hereinafter the blade angle adjustment drives will be described in more detail with reference to the blade angle adjustment drive 13.

Figure 3:
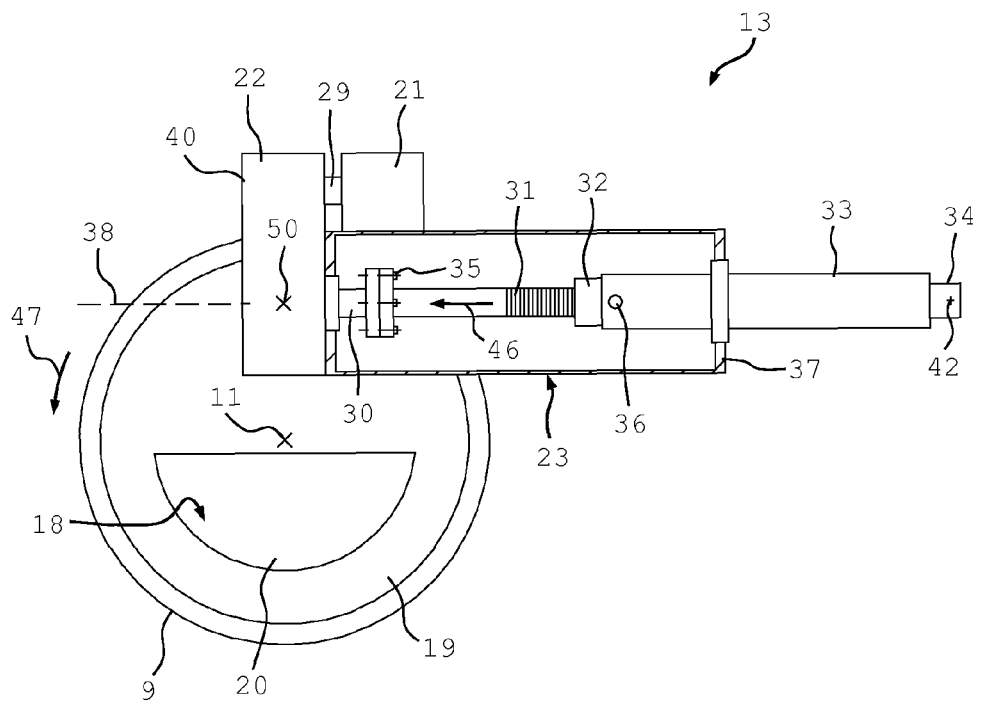
FIG. 3 is a schematic and partly sectional plan view of one of the blade angle adjustment drives according to FIG. 2.

The blade angle adjustment drive 13 is illustrated in FIG. 3, in which the motor 21 is coupled via its motor shaft 29 to the drive side of the transmission 22, whose drive side is coupled in turn to a coupling shaft 30. The coupling shaft 30 is connected in a torque-resistant manner to a threaded spindle 31, onto which a spindle nut 32 is screwed. The spindle nut 32 is securely connected to an actuating member 33, which is rotatably mounted on the rotor hub 8 at its end 34 facing away from the spindle nut 32. The linear adjustment member 23 thus comprises the threaded spindle 31, the spindle nut 32 and the actuating member 33. The coupling shaft 30 is preferably also included in the adjustment member 23.

The threaded spindle 31 is detachably connected to the coupling shaft 30 via fastening means 35, which are formed in this case as bolts. Furthermore the spindle nut 32 is detachably connected to the actuating member 33 via a fastening means 36, which is formed in this case as a bolt. The sub-assembly formed by the threaded spindle 31 and the spindle nut 32 can thus be replaced without having to dismantle the whole angle adjustment drive 13 or relatively large parts thereof.

The threaded spindle 31 and the spindle nut 32 are arranged in a housing 37, on which the actuating member 33 can be displaceably guided in the direction of the longitudinal axis 38 of the threaded spindle 31. Furthermore the coupling shaft 30 is rotatably mound on the housing 37 about the longitudinal axis 38. The housing 37, which overall is formed as a closed unit, comprises a removable cover 39 (see FIG. 2), by means of which an access opening to the inner chamber of the housing 37 can be exposed, so that the sub-assembly formed from the threaded spindle 31 and the spindle nut 32 can be accessed. The housing 37 is in particular counted as part of the adjustment member 23.

The blade angle adjustment drive 13 is formed as a threaded spindle mechanism, which on the one hand is linked via the end 34 of the actuating member 33 to the rotor hub 8 and on the other hand is linked via the housing 40 of the transmission 22 to the wall element 19. By rotating the threaded spindle 31 about its longitudinal axis 38 the threaded spindle 31 is moved in the direction of or in the opposite direction to the arrow 46 relative to the actuating member 33. Together with the threaded spindle 31, the transmission 22 and the drive 21 thus also move in the direction of or in the opposite direction to the arrow 46. Since the wall element 19 is connected in a torque-resistant manner to the rotor blade 9, as a result of this movement the rotor blade 9 is rotated relative to the rotor hub 8 about its blade axis 11 in the direction of or in the opposite direction to the arrow 47.

Figure 4:
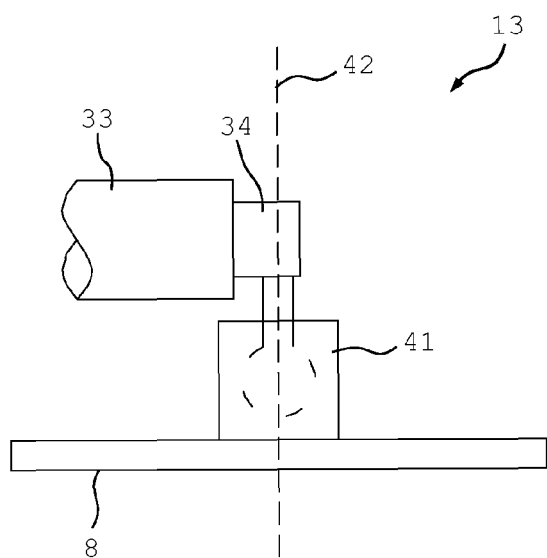
FIG. 4 is a schematic side view of a part of the blade angle adjustment drive according to FIG. 3.

A partial side view of the blade angle adjustment drive 13 is shown in FIG. 4, in which the end 34 of the actuating member 33 is mounted by means of a linkage 41 on the rotor hub 8. The linkage 41 allows a swivelling movement of the actuating member 33 about a swivel axis 42, which runs parallel to the blade axis 11. The linkage 41 is formed for example as a pivot joint, as a universal or Cardan joint, as a ball-and-socket joint or as an elastomeric bearing. Since the adjustment member 23 on account of its length passes through the wall of the rotor hub 8 and is mounted outside the rotor hub 8 on this, the wall of the rotor hub 8 has a longitudinal slit 48 (see FIG. 2) through which the adjustment member 23 extends. The longitudinal slit 48 permits a swivelling of the adjustment member 23 about the swivel axis 42.

Figure 5:
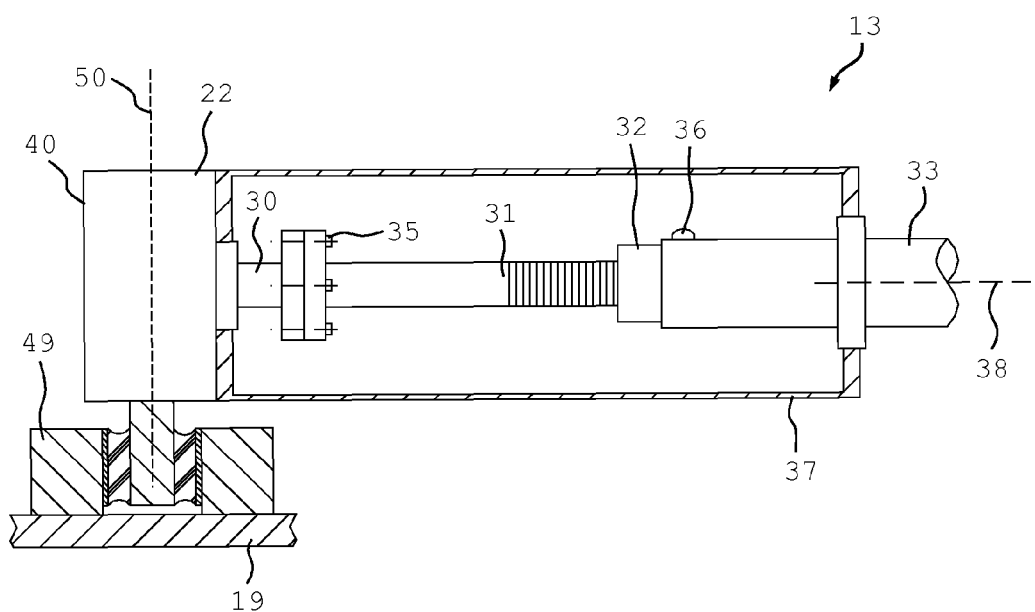
FIG. 5 is a schematic and partly sectional side view of another part of the blade angle adjustment drive according to FIG. 3.

Another partial side view of the blade angle adjustment drive is shown in FIG. 5, in which the housing 40 of the transmission 22 is rotatably mounted on the wall element 19 about a swivel axis 50 by means of a linkage 49. The swivel axis 50 runs parallel to the blade axis 11. Although the linkage 49 in this case forms an elastomeric bearing, the linkage 49 can also be formed as a pivot joint, a universal joint or as a ball-and-socket joint.

Figure 6:
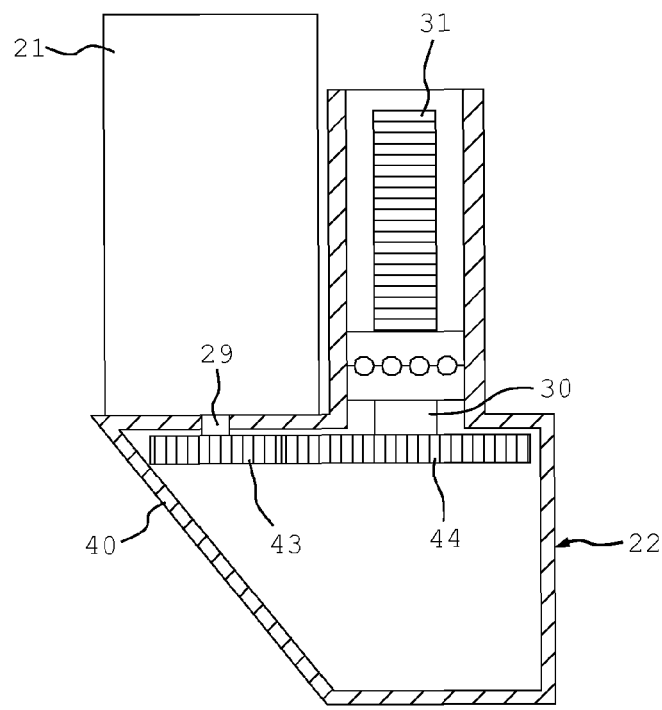
FIG. 6 is a schematic and partly sectional view of the transmission visible in FIG. 3.

A partial sectional view of the transmission 22 is shown in FIG. 6, in which the motor shaft 29 is connected in a torque-resistant manner to a toothed gear 43, which meshes with a toothed gear 44 that is connected in a torque-resistant manner to the coupling shaft 30. In this case the motor shaft 29 runs parallel to the coupling shaft 30 and to the threaded spindle 31.

Figure 7:
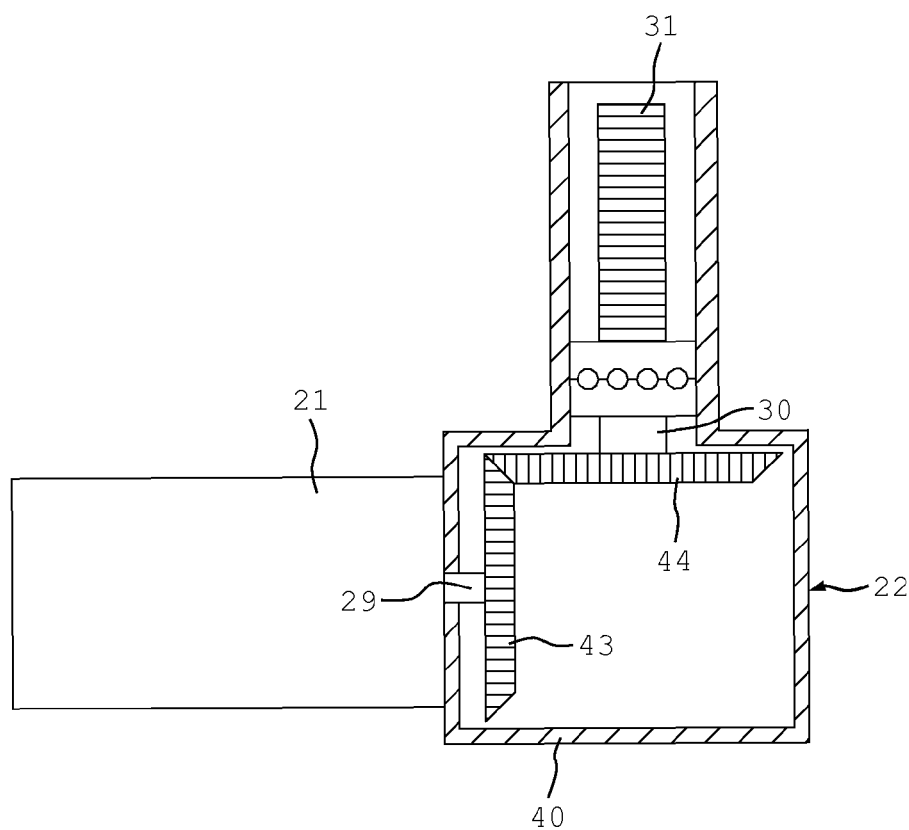
FIG. 7 is a schematic and partly sectional view of a transmission according to a second embodiment of the invention.
Figure 8:
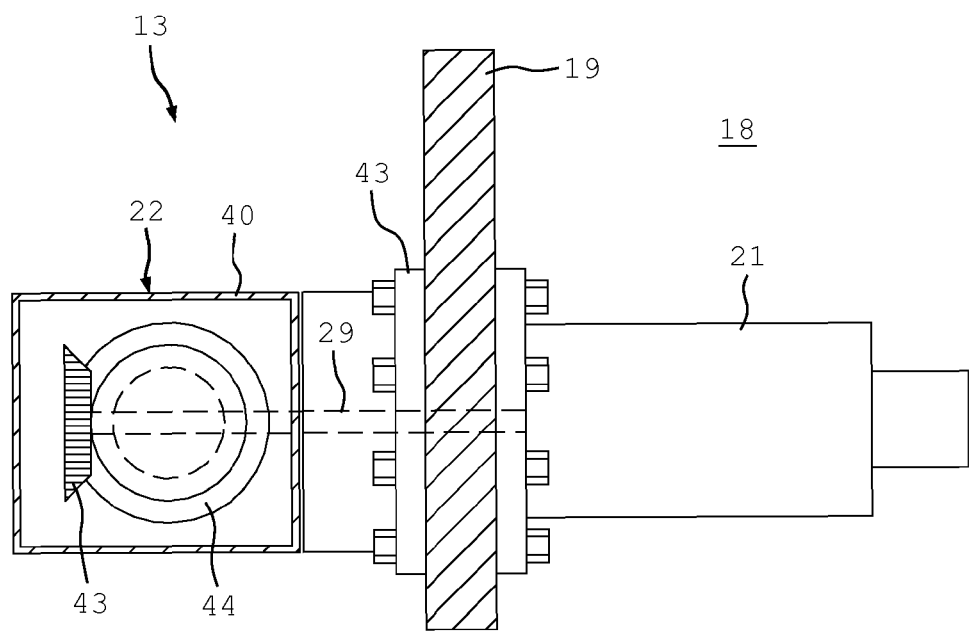
FIG. 8 is a schematic and partly sectional side view of a blade angle adjustment drive according to a third embodiment of the invention.

Further embodiments of the invention are shown in FIGS. 7 and 8, in which features identical or similar to those of the first embodiment are identified by the same reference numerals as in the first embodiment.

FIG. 7 shows a partial sectional view of a transmission 22 according to a second embodiment of the invention, in which the motor shaft 29 runs perpendicular to the coupling shaft 30 and to the threaded spindle 31, and in which the two toothed gears 43 and 44 are respectively formed as a bevel gear. Due to this configuration of the transmission 22 another arrangement of the electric motor 21 relative to the adjustment member 23 is also provided. Apart from these differences the second embodiment is however substantially identical to the first embodiment, so that as regards the further description of the second embodiment reference will be made to the description of the first embodiment.

A partial sectional representation of a blade angle adjustment drive 13 according to a third embodiment of the invention is shown in FIG. 8, in which the transmission 22 and the drive 21 are arranged on different sides of the wall element 19. In particular the drive 21 is installed in the inner chamber 18 of the rotor blade 9. Apart from these differences the third embodiment is however substantially identical to the second embodiment, so that as regards the further description of the third embodiment reference will be made to the description of the previous embodiments.

The invention claimed is:

1. A rotor for a wind turbine comprising:
a rotor hub;
at least one rotor blade mounted on the rotor hub and rotatable about a blade axis; and
a blade angle adjustment drive having:
 a threaded spindle mechanism;
 a motor forming a drive and having an output shaft; and
 a transmission operably coupled to the output shaft of the motor;
 the threaded spindle mechanism interconnecting the rotor hub and one of the at least one rotor blade, the threaded spindle mechanism including a spindle nut, a threaded spindle and the drive, and wherein the drive and the transmission are both mounted on the rotor blade adjacent a transition between the rotor hub and the rotor blade, the drive and the transmission being configured to drive the threaded spindle rotationally, and the drive and the transmission further being rotatable together with the rotor blade about the blade axis, wherein the at least one rotor blade is rotatable about the blade axis relative to the rotor hub by actuation of the threaded spindle mechanism.

2. The rotor according to claim 1, wherein at least a portion of the drive projects into an inner chamber of the rotor hub.

3. The rotor according to claim 2, wherein the drive is arranged in the inner chamber.

4. The rotor according to claim 1, further comprising a wall portion secured to an end of the rotor blade facing towards the rotor hub on which the drive is mounted.

5. The rotor according to claim 1, wherein both the drive and the transmission are rotatably mounted on the rotor blade about a swivel axis running in the direction of the blade axis and spaced therefrom.

6. The rotor according to claim 1 further comprising a sub-assembly including the threaded spindle and the spindle nut, the sub-assembly being rotatably mounted on the rotor hub about a swivel axis running in the direction of the blade axis and spaced therefrom.

7. The rotor according to claim 1, wherein the threaded spindle is coupled to the drive and is rotatable by the drive about a longitudinal spindle axis, and wherein the spindle nut is mounted on the rotor hub.

8. The rotor according to claim 7, wherein the threaded spindle mechanism comprises an actuating member coupled to the spindle nut, by means of which the spindle nut is mounted on the rotor hub.

9. The rotor according to claim 8, wherein the threaded spindle is detachably coupled to the drive, the actuating member being detachably coupled to the spindle nut.

10. The rotor according to claim 1, wherein the drive is mounted on the rotor blade via the transmission and laterally offset from the threaded spindle.

11. The rotor according to claim 1, wherein the transmission includes a coupling shaft operably coupled to the threaded spindle for driving the threaded spindle in response to rotational movement of the output shaft of the motor, the output shaft further being arranged to run transverse to the longitudinal axis of the threaded spindle.

12. The rotor according to claim 11, wherein the drive is mounted on the rotor blade via the transmission.

13. The rotor according to claim 1, wherein the output shaft of the drive is coupled to the threaded spindle and runs parallel to the longitudinal axis of the threaded spindle.

14. The rotor according to claim 13, wherein the drive is mounted on the rotor blade via the transmission.

15. The rotor according to claim 1, wherein the drive is an electric motor.

* * * * *

UNITED STATES PATENT AND TRADEMARK OFFICE
CERTIFICATE OF CORRECTION

| | | |
|---|---|---|
| PATENT NO. | : 9,255,568 B2 | Page 1 of 1 |
| APPLICATION NO. | : 13/511870 | |
| DATED | : February 9, 2016 | |
| INVENTOR(S) | : Fabio Bertolotti | |

It is certified that error appears in the above-identified patent and that said Letters Patent is hereby corrected as shown below:

On the Title Page,
Item (30) Foreign Application Priority Data, line 1, "10 2009 044 667" should be --10 2009 044 667.2--.

In the Specification,
Column 4,
Line 48, after "and", insert --14--.

Column 6,
Line 10, after "drive", insert --13--.

Signed and Sealed this
Fourteenth Day of June, 2016

Michelle K. Lee
*Director of the United States Patent and Trademark Office*